(12) United States Patent
Smith

(10) Patent No.: US 8,086,280 B2
(45) Date of Patent: Dec. 27, 2011

(54) EXPLOSION PROOF COMMUNICATIONS RELAY AND COMMUNICATIONS SYSTEM

(75) Inventor: Clint Smith, Warwick, NY (US)

(73) Assignee: Rivada Networks LLC, Centreville, VA (US)

( * ) Notice: Subject to any disclaimer, the term of this patent is extended or adjusted under 35 U.S.C. 154(b) by 336 days.

(21) Appl. No.: 12/485,118

(22) Filed: Jun. 16, 2009

(65) Prior Publication Data

US 2010/0159823 A1     Jun. 24, 2010

Related U.S. Application Data

(60) Provisional application No. 61/061,873, filed on Jun. 16, 2008.

(51) Int. Cl.
*H04B 7/16* (2006.01)
*H04B 1/38* (2006.01)

(52) U.S. Cl. ..... 455/571; 455/11.1; 455/574; 455/343.1

(58) Field of Classification Search ............... 455/575.1, 455/90.3, 7, 11.1, 16, 571, 343.1
See application file for complete search history.

(56) References Cited

U.S. PATENT DOCUMENTS

| | | | |
|---|---|---|---|
| 6,788,942 B2 * | 9/2004 | Owens et al. | 455/445 |
| 7,376,389 B2 * | 5/2008 | Bassiri et al. | 455/7 |
| 2011/0111700 A1 * | 5/2011 | Hackett | 455/41.2 |

* cited by examiner

*Primary Examiner* — Tilahun B Gesesse
(74) *Attorney, Agent, or Firm* — The Marbury Law Group, PLLC

(57) ABSTRACT

A wireless communication system for use in an explosive environment includes at least a pair of explosion-proof communication relay modules which relay communication to mobile communication devices in locations beyond the reach of normal wireless communications with base station antennas. The explosion-proof communication relay modules include features to preclude the generation of a spark or heat source which could ignite any explosive gas or vapor. Similarly, explosion-proof mobile devices include design features which also preclude the generation of a spark or heat source.

17 Claims, 10 Drawing Sheets

EXPLOSION PROOF COMMUNICATIONS RELAY AND COMMUNICATIONS SYSTEM

RELATED APPLICATIONS

This application claims the benefit of priority to U.S. Provisional Patent Application No. 61/061,873 entitled "Explosion Proof Communications Relay and Communication System" filed Jun. 16, 2008, the entire contents of which are hereby incorporated by reference.

FIELD OF THE INVENTION

The present invention generally relates to explosion proof communications equipment, and more particularly to a cellular communications relay unit suitable for use in a hazardous environment.

BACKGROUND OF THE INVENTION

Each day workers put themselves at risk by working in dangerous or potentially dangerous environments involving explosive vapors or gasses. For example, in addition to the risk of cave-ins, sub-surface miners face the risk toxic fumes and explosive gases on a daily basis. As another example, firemen and other first responders frequently have to venture into buildings, subways and sewers filled with explosive gasses in order rescue victims and save property.

Chief among the dangers facing such workers is the possibility of an explosion due to detonation of explosive vapors, gasses and dust suspended in the air in a confined space. One of the top causes of mine explosions is the detonation of explosive gases, such as methane, which can enter the mine through the Earth that is being mined. If proper ventilation procedures are not taken, methane gas (or other explosive gases) may collect in the mine. Any ignition source may explosively ignite the gas and lead to catastrophic results.

Fire and rescue personnel face similar dangers when hurricane, tornado or terrorist attacks leave buildings in ruble with natural gas lines leaking. As another example, fire and rescue personnel responding to refinery incidents, and automobile and aircraft accidents can face explosive vapor situations resulting from gasoline and diesel fumes. While gas and vapor levels in one part of a building appear safe, gas and fumes can accumulate in pockets, pits or enclosed rooms to reach potentially explosive concentrations.

In addition to explosive gases, combustible dust can give rise to an explosive environment. Such dust explosion risks can arise in a variety of situations such as factory mishaps, grain milling and storage facilities.

In addition to fire and rescue personnel, many work environments require communications in the presence of explosive gasses and vapors. The Occupational Safety and Health Administration (OSHA) has classified a number of hazardous work environments where special precaution must be taken to provide workers with safe working conditions. The most extreme work environment is classified as Class I, Division 1. A Class I, Division I work environment is a location in which: (a) hazardous concentrations of flammable gases or vapors may exist under normal operating conditions; or (b) hazardous concentrations of such gases or vapors may exist frequently because of repair or maintenance operations or because of leakage; or (c) breakdown or faulty operation of equipment or processes might release hazardous concentrations of flammable gases or vapors, and might also cause simultaneous failure of electric equipment.

Examples of work locations where Class I, Division I classifications are typically assigned include: locations where volatile flammable liquids or liquefied flammable gases are transferred from one container to another; interiors of spray booths and areas in the vicinity of spraying and painting operations where volatile flammable solvents are used; locations containing open tanks or vats of volatile flammable liquids; drying rooms or compartments for the evaporation of flammable solvents; locations containing fat and oil extraction equipment using volatile flammable solvents; portions of cleaning and dyeing plants where flammable liquids are used; gas generator rooms and other portions of gas manufacturing plants where flammable gas may escape; inadequately ventilated pump rooms for flammable gas or for volatile flammable liquids; the interiors of refrigerators and freezers in which volatile flammable materials are stored in open, lightly stoppered, or easily ruptured containers; and all other locations where ignitable concentrations of flammable vapors or gases are likely to occur in the course of normal operations.

For personnel who work in such environments on a daily basis, a communication system is needed that can safely operate in explosive environments. Similarly, emergency services personnel who may have to enter explosive environments to respond to emergency situations need a deployable explosion-proof communication system. Cellular telephones would normally provide cost effective and reliable communications, but cellular signals may not penetrate buildings, sewers and mines where workers and emergency services personnel may need to travel. Conventional methods for boosting and relaying cellular communications cannot be used in explosive environments because they could spark an explosion. Additionally, conventional cellular telephones may serve as ignition sources and so cannot be safely taken into an explosive environment.

SUMMARY OF INVENTION

The various embodiments provide a scalable, wireless, multi-channel, two-way communication system hermetically sealed and provided with fault-tolerant electronic circuitry which in combination enable the communication systems to be used in explosive environments. Various embodiments provide portable explosion-proof communication relay modules that can be distributed throughout an explosive environment to provide sufficient wireless network coverage to support rescue personnel in a wide variety of situations. The portable explosion-proof communication relay module may include fault-tolerant electronics that are battery powered and enclosed within a non-metallic sealed housing to remove the potential for any source of spark or heat. An inductive charging element may be built into the housing to enable charging of the battery without any exposed metal contacts that could serve as a source for a spark. The portable explosion-proof communication relay module may include sealed displays and control buttons sized to enable operation by personnel wearing gloves and protective clothing. In an embodiment, an explosion proof communication system includes the portable explosion-proof communication relay module and explosion-proof mobile devices, such as hermetically sealed cellular telephone communication units.

BRIEF DESCRIPTION OF THE DRAWINGS

The accompanying drawings, which are incorporated herein and constitute part of this specification, illustrate embodiments of the invention, and, together with the general description given above and the detailed description given below, serve to explain features of the invention.

DETAILED DESCRIPTION OF THE PREFERRED EMBODIMENT

Figure 1:
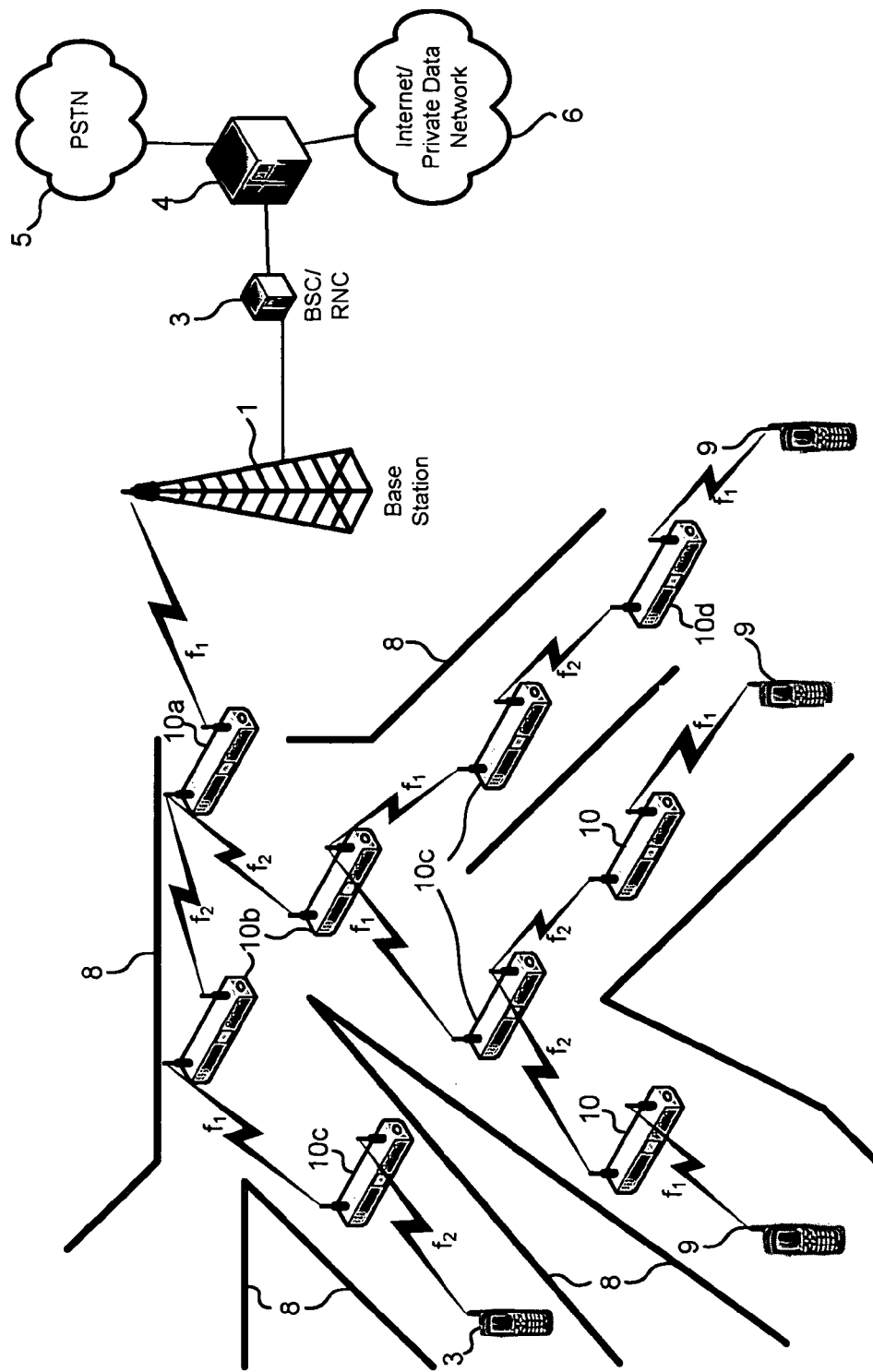
FIG. 1 is a system block diagram illustrating a cellular wireless communication system for use in an explosive environment according to an embodiment.

Various embodiments will be described in detail with reference to the accompanying drawings. Wherever possible, the same reference numbers will be used throughout the drawings to refer to the same or like parts. References made to particular examples and implementations are for illustrative purposes and are not intended to limit the scope of the invention or the claims.

As used herein, the terms "about" or "approximately" for any numerical values or ranges indicates a suitable tolerance that allows the part or collection of components to function for its intended purpose as described herein.

As used herein, the terms "cellular telephone," "cell phone" and "mobile device" are used interchangeably and refer to any one of various communication devices, including cellular telephones, personal data assistants (PDA's), land mobile radios (LMR), two-way radios, wireless electronic mail receivers (e.g., the Blackberry® and Treo® devices), multimedia Internet enabled cellular telephones (e.g., the iPhone®), and similar personal electronic devices, as well as palm-top computers and laptop computers with wireless modems. A mobile device may include a programmable processor and memory as described in more detail below with reference to FIG. 9. In a preferred embodiment, the mobile device is a cellular handheld device (e.g., a cellphone), which can communicate via a cellular telephone network. In a second preferred embodiment the mobile device is a land mobile radios (LMR). Thus, references to cellular telephones in the descriptions of the various embodiments are not intended to exclude other communication devices and two-way radios.

In the following descriptions of the various embodiments, references to the frequencies used for cellular telephone communications are intended to encompass any and all cellular telephone frequencies currently used, including the 800 MHz AMPS band (which is cited in many examples), the 450 MHz, 700 MHz, 850 MHz bands, the 1710-1755 MHz and 2110-2155 MHz AWS bands (as well as future AWS bands), and the 1.8-2 GHz PCS band, as well as other mobile cellular bands that may be employed in the future. Additionally, the various embodiments may also be implemented with cellular wireless networks, such as WiFi and WiMAX which operate at different frequencies. For illustrative purposes, specific AMPS frequencies (namely 890 and 845 MHz) are cited as examples of the $f_1$ and $f_3$ frequencies in describing some embodiments. These references to particular frequencies are intended to be illustrative examples only and are not intended to limit the scope of the invention or the claims to particular frequencies, bands or cellular communication protocols unless specifically recited in the claims.

A number of hazardous work environments exist where conventional communication systems are either impractical or cost prohibitive or both. For example, in a sub-surface mine environment, interference and physical obstructions may prevent effective radio communication without the use of relays. In addition, the harsh conditions and vast size of commercial mines make conventional wired communication impractical and cost prohibitive. Accordingly, conventional communications systems operating in such environments rarely have a range beyond the line of sight. In most instances, communication in a mine is conducted either face to face or through visual signals such as flags. Due to the nature of the work, miners are constantly exposed to the potential of explosive gases. Thus, a communication system suitable in such an environment would need to be affordable, extensible, and rated to operate in potentially explosive environments.

Many other industries require workers to enter potentially explosive environments. Cellular telephones are not designed to operate in explosive environments and so lack fault tolerance circuitry and have exposed metal contacts which could serve as spark initiators. Therefore, any one entering potentially explosive environments must forgo their conventional cellular telephones.

Emergency services personnel using conventional communications equipment also face the risk of causing explosions when they must enter collapsed buildings, underground passage ways and subways, or vehicle or aircraft accident scenes where explosive vapors may be generated or accumulate. In such situations emergency services personnel need effective and efficient communications to coordinate with others, call in medical assistance or seek advice from commanders and technicians positioned outside the danger area. However, conventional communications systems may not be feasible due to their potential to initiate an explosion if used in explosive environments.

To minimize the risk of explosion in such dangerous situations, it is critical that all equipment used by workers who must venture into such environments be designed to remove all possible ignition sources. Electrical equipment, even low voltage equipment, is of particular concern due to the possibility of a spark generated by a shorted circuit which may ignite a highly explosive environment. Additionally, communication equipment has the potential of inducing voltages in exposed metal components which can also cause a spark under certain circumstances.

Ideally, a communication system for use in explosive environments will be scalable so that the extent and range of communication coverage can grow and shrink as the situation requires. In addition, it is desirable to have communication equipment which is mobile so that the equipment can be easily moved during a rescue operation and quickly re-deployed to the next emergency location. Also, it is desirable to have communication equipment supporting the communication system that is durable and cost efficient to operate. Preferably, a communication system would provide wireless mobile stations which provide users with the necessary mobility to move about while providing sufficient quality of service to maintain voice and data communications.

The widespread use of cellular telephone communications makes such mobile devices ideal for many ad hoc communication situations. Most rescue workers own a cellular telephone and the commercial cellular telephone network connects to the entire global communications system without the need for further expensive equipment. Using cellular telephones as the primary communications devices increases both capacity and coverage while reducing capital expenditure and operating expenditure. The ubiquity of cellular telephones means that nearly every worker will know how to effectively employ the communication system with little if any training. However, cellular telephone signals will not penetrate through many buildings and will not carry underground, such as in subways, tunnels and mine shafts. To extend cellular telephone communications into such locations, relay units may be employed. An example of cellular relay is referred to as a "femtocell."

A femtocell—originally called an Access Point Base Station—is a scalable, multi-channel, two-way communication device that can relay cellular communication signals to the nearest cellular base station. A femtocell is a small cellular base station, typically designed for use in residential or small business environments. It connects to the service provider's network via broadband (such as DSL or cable); current designs typically support 2 to 5 cellular telephones in a residential setting. A femtocell allows service providers to extend service coverage indoors, especially where access would otherwise be limited or unavailable.

Femtocells are an alternative way to deliver the benefits of Fixed Mobile Convergence (FMC). The distinction is that most FMC architectures require a new (dual-mode) mobile handset, while a femtocell-based deployment will work with existing handsets. As a result, Access Point Base Stations must work with handsets that are compliant with existing Radio Access Network (RAN) technologies.

While the femtocell concept is useful for extending cellular telephone communications into spaces where cellular telephone signals are not able to penetrate, a conventional femtocell cannot be used in explosive environments. This is because the conventional femtocell design presents a number of potential ignition sources that could cause an explosion if exposed to flammable or explosive vapor or gases. Switches and contacts used to control the femtocell can generate sparks during operation which can initiate explosions. Exposed metal electrical contacts for connecting batteries or battery chargers can generate sparks if there is an internal electrical fault or when exposed to electromagnetic radiation emitted by the antenna. Internal circuitry is not designed to eliminate all possibilities for fault-induced short-circuits and heat sources. Further, a conventional femtocell may emit electromagnetic radiation at power levels sufficient to induce arching on nearby metal surfaces.

The various embodiments overcome the limitations in cellular telephone and other mobile wireless communication systems to enable their use in explosive environments including the ability to relay cellular communications deep into building and underground facilities where cellular signals cannot normally reach. A portable explosion-proof communication relay module is provided which features a hermetically sealed casing that encompasses all circuit and metal contacts, fault tolerant electrical circuitry, an induction charging module for recharging internal batteries without the need for any exposed metal contacts, and a power management algorithm which maintains output power at the lowest level that can provide adequate communications. In order to complete the communication system, an explosion proof mobile communication device, such as a cellular telephone, is provided which is hermetically sealed, includes fault tolerant circuitry, an induction charging module for recharging internal batteries without the need for any exposed metal contacts. As a further embodiment, a nonmetallic sealed container is provided for encompassing conventional mobile communication devices, such as cellular telephone handsets, so that they can be taken into an explosive environment.

Establishing cellular communications in underground tunnels or within buildings can be a particularly daunting communication challenge. Cellular telephone radiation does not pass through solid walls, metal or the ground. In order to extend cellular communication into such structures, a network of communication repeater units must be implemented. Communication repeater units receive a weak signal and rebroadcast that signal at higher power to extend its reach into the building or tunnel. In a new construction building, such communication repeater units can be included within the buildings infrastructure. However, in an emergency situation where such communication repeaters do not already exist, communication repeater units have to be laid down by emergency response personnel as the situation unfolds. If there is the potential of explosive gasses in the vicinity, conventional communication repeater units cannot be utilized since they could serve as explosion initiators.

To address this problem, the various embodiments provide explosion-proof communication relay modules 10 and explosion-proof mobile devices, such as cellular telephones 9 which are configured for safe operation in an explosive environment and to extend the reach of a communication network, such as a cellular telephone network. FIG. 1 illustrates an example communication system implementing the various embodiments. The embodiments may make use of the commercial cellular network, including all cellular technologies such as a CDMA (Code Division Multiple Access) or GSM (Global System for Mobile communications) cellular networks, as well as different implementations of these basic cellular technologies, including LTE, WCMDA, TD-CDMA, and TD-SCDMA. Additionally, the embodiments may also be implemented with wireless cellular data network protocols, such as WiFi and WiMAX. Such a network includes a multitude of base station antennas 1 each connected to a base station controller or regional network controller (BSC) 3 which is connected to a cellular network switch center (RNC) 4 which connects cellular telephone voice and data calls to the standard telephone network 5 and/or a data network such as the Internet 6.

In a situation where the cellular wireless communication signals emitted from the base station 1 (emitted at frequency $f_1$) cannot penetrate the walls 8 of a building, tunnel or subway system, a first explosion-proof communication relay module 10a can be placed at an entrance where communication signals can be reliably transmitted to and received from a base station 1. The explosion-proof communication relay module 10a receives the cellular communication signals at frequency $f_1$ from the base station 1 and retransmits the signals at a different frequency $f_2$ that can be received by other explosion-proof communication relay modules 10b within range. The other explosion-proof communication relay modules 10b that are in range of communication relay module 10a receive the forwarded signals in frequency $f_2$ and rebroadcast the same signal at the frequency $f_1$ of the cellular system. Explosion-proof mobile devices, such as cellular telephones 9 within range of such explosion-proof communication relay modules 10b are able to communicate with the external telephone and/or data networks 5, 6 via the communication relays through modules 10b and 10a. To provide communication further into the building, mine or tunnel system, additional pairs of explosion-proof communication relay modules 10c, 10d are laid down at appropriate intervals. As with the first pair of relay modules 10a, 10b, the third relay module 10c rebroadcasts signals received at frequency $f_1$ into signals at the second frequency $f_2$ which is received by the fourth relay module 10d which rebroadcasts the signals at the frequency $f_1$ of the cellular system. Thus, cellular telephones 9 within range of the fourth layer of explosion-proof communication relay modules 10d are able to communicate with the external telephone network via the communication relays through modules 10a through 10d.

By using a number of explosion-proof communication relay modules 10, the range of cellular telephone communications can be reliably extended into buildings, mines, caves, sewers, and tunnels without boosting the transmission power to a level that might induce arching on nearby metal surfaces which could trigger an explosion. By converting frequencies at each explosion-proof communication relay module 10 between first and second frequencies, problems of communication ring-back and sympathetic power amplification can be minimized. Also, the circuit design can be simplified, thereby reducing the cost of the explosion-proof communication relay modules 10.

As illustrated in the communication architecture shown in FIG. 1, with the simple addition of a plurality of explosion-proof communication relay modules 10, emergency response personnel can be provided with an effective communication system that couples them to the outside world via ordinary cellular telephone communications. Thus, a robust and extendable communication system for explosive environment response (where normal cellular communications is not achievable) can be provided at low cost. Further, since emergency service personnel are fully familiar with cellular telephone operations, such an emergency communication system can be provided without the need further personnel training.

Figure 2A:
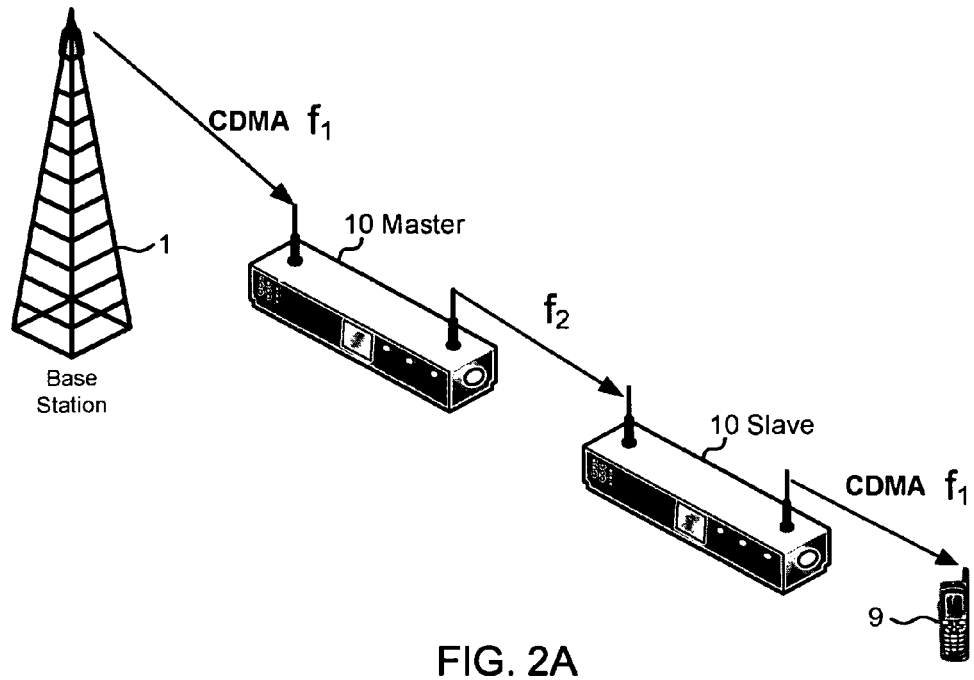
FIGS. 2A and 2B are communication system block diagrams illustrating a detail of the system illustrated in FIG. 1 according to an embodiment.
Figure 2B:
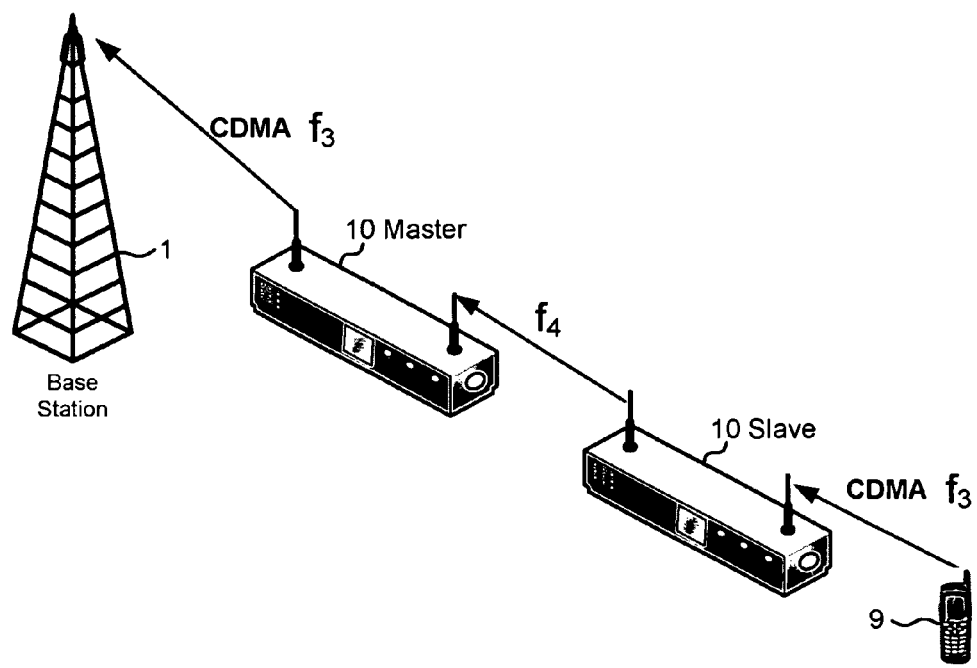

The communication architecture illustrated in FIG. 1 can be implemented on half-duplex and full duplex communication systems. For cellular telephone communications, which are full duplex using different frequencies for transmitting and receiving, different relay frequencies (i.e., $f_2$ in FIG. 1) can be used for conveying communication signals in both directions between two explosion-proof communication relay modules 10. An example embodiment applicable to CDMA cellular telephone communications is illustrated in FIGS. 2A and 2B which shows a subset of the communication architecture illustrated in FIG. 1. For example, using CDMA cellular telephone communications in the AMPS (Advanced Mobile Phone Service) band, transmissions from base stations 1 are transmitted to cellular telephones at 890 MHz, while transmissions from cellular telephones 9 are transmitted to base station antennas at 845 MHz. As mentioned above, frequencies cited in the examples are for illustrative purposes only and are not intended to limit the invention to specific frequencies unless specifically recited in a particular claim.

Such duplex communications may be detected and relayed by explosion-proof communication relay modules 10 by using different relay frequencies for the different direction communications. For example, referring to FIG. 2A, transmissions from the base station antenna 1 intended for an explosion proof cellular telephone 9 can be relayed by a first explosion-proof communication relay module 10 (referred to as a "master" relay) to a second explosion-proof communication relay module 10 (referred to as a "slave" relay) at a second frequency ($f_2$), such as 4.89 GHz. This example frequency is selected because the 4.9 GHz radio band is allocated to emergency personnel communications, but other frequencies could be used as described more fully below. By simply up-converting the 890 MHz CDMA transmission frequency by 4 GHz, the relay frequency $f_2$ can carry the same information as in the signal transmitted from the base station 1. When received at the slave explosion-proof communication relying module 10, the signal is converted back to the original frequency ($f_1$) of 890 MHz. This signal can then be received by a conventional cellular telephone 9 without modifications to its transceiver.

Referring to FIG. 2B, transmissions from the cellular telephone 9 can be relayed to the distant base station antenna 1 via two explosion-proof communication relay modules 10 by up-converting the signals transmitted at 824 MHz ($f_3$) to a relay frequency ($f_4$) of, for example, 4.824 GHz. The relay frequency ($f_4$) signal transmitted by the slave explosion-proof communication relay module 10 contains the same information as the original signal transmitted by the mobile device 9. The relayed signal is received by the master explosion-proof communication relay module 10 where it is down-converted to the original frequency ($f_3$) for reception by the base station antenna 1. Again, the relay frequency of 4.824 GHz is provided merely as an example that can be generated by up-converting the 824 MHz CDMA transmission frequency by 4 GHz.

FIGS. 2A and 2B illustrate a CDMA cellular telephone communication system by way of example only, and are not intended to limit the scope of the description or the claims to one particular cellular technology. The same concepts described above with reference to FIGS. 2A and 2B can be applied to support communications with GSM cellular telephones. Accordingly, general references to cellular telephone technologies and types are intended to encompass all types of cellular technologies including GSM and CDMA technologies.

It should be appreciated that the relay frequency (i.e., $f_2$ in FIG. 1) can be any frequency and is not limited to the 4.9 GHz range illustrated in FIGS. 2A and 2B, which is merely provided as an example. Any available frequency range may be utilized for the relay frequency. For emergency services applications where deployment of explosion-proof communication relay modules 10 is likely limited to emergency situations in areas of limited radio frequency transmission (e.g., under ground in subways, sewers, mines, tunnels or explosion craters), the relay frequency may be selected to reduce the likelihood that electromagnetic radiation will induce currents in surrounding metals that could cause arching, or based upon the transmission characteristics without concern for interference with frequencies allocated to other commercial communications. For non-emergency applications, such as for use in mining and chemical/petroleum industrial facilities, the relay frequency may be selected based upon local communications conditions, such as to minimize interference with other communications known to exist in the vicinity. For above ground applications, it is expected that licensing by the Federal Communications Commission (FCC) will be required which may constrain the relay frequency to available bands.

While the foregoing description of an embodiment of a communication system employing explosion-proof communication relay modules 10 included cellular telephones 9 as the personal communication devices, the architecture may be applied similarly to any deployable communication devices such as LMR two-way radios. The differences in such communications systems from the foregoing description are limited to the frequencies of the mobile devices and, in the case of LMRs, to the fact that two-way radio communications are transmitted and received on the same frequency (i.e., communications are half-duplex or simplex, unlike cellular communications which are full duplex).

Figure 3:
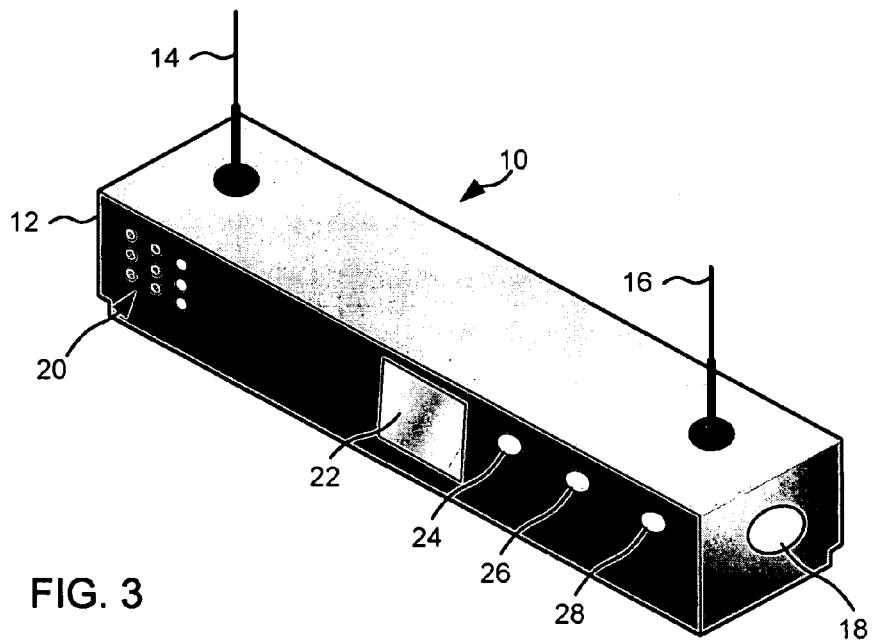
FIGS. 3 and 4 are perspective drawings of two embodiments of a portable explosion-proof communication relay module.

An example embodiment of an explosion-proof communication relay module 10 is illustrated in FIG. 3. The relay module includes a sealed case or housing 12 which fully encompasses all electronics, wires, contacts and metal elements of the relay. By sealing all electronics and metal within a non-conductive case, such as plastic, rubber, Plexiglas, etc., potential sources of ignition are isolated from the exterior atmosphere. Any of a variety of known mechanisms for creating an airtight seal among plastic components can be used in the design of the housing 12, including snap fits and compression fits with sealing rings and threaded fasteners (e.g., nylon screws) to provide sealing pressure. Within the housing 12 are electronics described more fully below with reference to FIGS. 5-7 which send and receive radio frequency signals via a first antenna 14 and send and receive radio frequency signals at a second frequency from a second antenna 16. The airtight seal of the housing 12 encompasses the metal parts of the first and second antennas 14, 16.

In order to reduce the potential sources of arching that could cause an explosion, the explosion-proof communication relay module 10 is powered by an internal battery, which may be one or more rechargeable or non-rechargeable batteries. Rechargeable batteries are advantageous because the housing 12 does not need to be opened to periodically replace batteries. Any form of rechargeable battery may be used, such as nickel cadmium, nickel hydride, nickel-metal hydride, or lithium-ion batteries. To eliminate external metal contacts, which could serve as sources of a spark or arching, the internal rechargeable battery may be recharged using an induction charging system which fits into a charging receptacle 18 in the housing 12. Details regarding the induction charging system and charger are described more fully below with reference to FIGS. 5, 7 and 9.

Status and configuration indicators may be provided in the housing 12, such as light emitting diode (LED) status indicators 20 and/or a liquid crystal display 22. In order to support operations in dark areas, such as in dimly lit or dark mines or tunnels, the liquid crystal display 22 may be provided with a backlight illuminator. LED indicators may be provided to inform users regarding a variety of aspects concerning the module's status and configuration. For example, LEDs may be provided to indicate on/off state, battery charge level, recharging state, power level of the received signal (e.g., a stack of LEDs which illuminate in series to graphically represent a relative signal strength), transmission power level (e.g., a stack of LEDs which illuminate in series to graphically represent a relative power level), transmit and receive frequency selections (e.g., radio types or channels), etc. The use of LEDs as status indicators is beneficial because LED elements are cool, with no hot filament that could be exposed to the atmosphere if broken, and because their electronic elements can be sealed within the housing 12. Also, LED status displays can be color coded and physically arranged to be easily understood by users under stressful situations.

Similarly, a liquid crystal display 22 can be provided to inform users of a variety of information regarding the status and configuration of the module. The liquid crystal display 22 is sealed within the housing 12, such as by means of a clear glass or plastic window in the housing. The glass or plastic window may be tempered or otherwise made impact resistant so that in the event that the module is dropped on the display the internal electronics are not thereby exposed to the atmosphere.

The housing may also include user control input elements, such as pushbuttons 24, 26, 28, to enable users to activate and configure the explosion-proof communication relay module 10. Such user input elements are preferably configured to be operated by individuals wearing heavy protective gloves, and so maybe oversized pushbuttons. The user control input elements are sealed within the housing 12 such as by means of a flexible plastic or rubber cover over moving elements, connectors and electronics. Any of a variety of known buttons or switches may be used as user input elements. Separate user input elements may be provided to enable users to turn the explosion-proof communication relay module 10 on or off 24, configure or select the reception and transmission frequencies 26, and configure or select the transmission power 28. User input elements may also be provided to: enable users to indicate to the module whether an explosive environment condition exists (such as may be useful in controlling the output power level); initiate a self-diagnostic routine; activate or deactivate a standby mode; initiate battery charging; or set other operational parameters or states.

Figure 4:
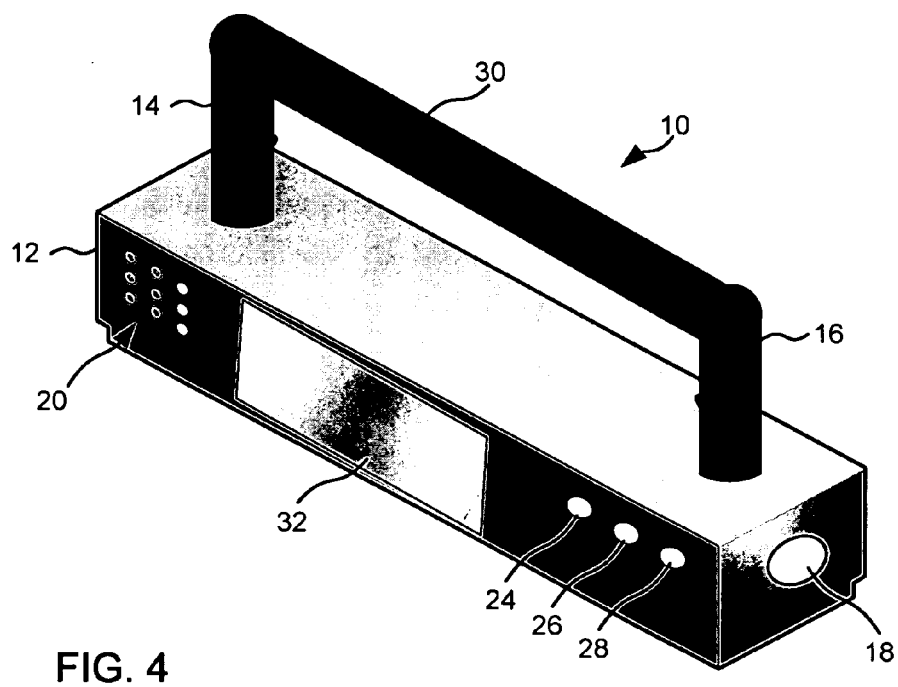

An alternative embodiment of the explosion-proof communication relay module 10 is illustrated in FIG. 4. In this embodiment, the first and second antennas 14, 16 are incorporated within a handle 32 to protect the antennas from damage and provide an easy mechanism for carrying and positioning the module. As with the housing 12, the handle 30 is preferably made from a nonconductive plastic or rubber.

FIG. 4 also illustrates an alternative user control input element in the form of a touchscreen 32. As is well known in the art, a touchscreen can sense the touch and position of a finger or object (e.g., a stylus) which, combined with appropriately positioned graphics, can be configured to request and receive user input selections. Since a touchscreen 32 can be configured with software to present any user input display desired, such a user input element is very flexible and can be updated or modified over time without the need to replace the user input element or physically modify the housing 12. Also, touchscreens 32 can us color to help inform users of the functions of various touch prompts (i.e., the graphic indicating where a user should touch on the screen in order to make a particular selection). Ideally user input displays will be configured in software to accommodate the gloved hand of users, such as by providing large touch prompts for accepting user inputs.

Figure 5:
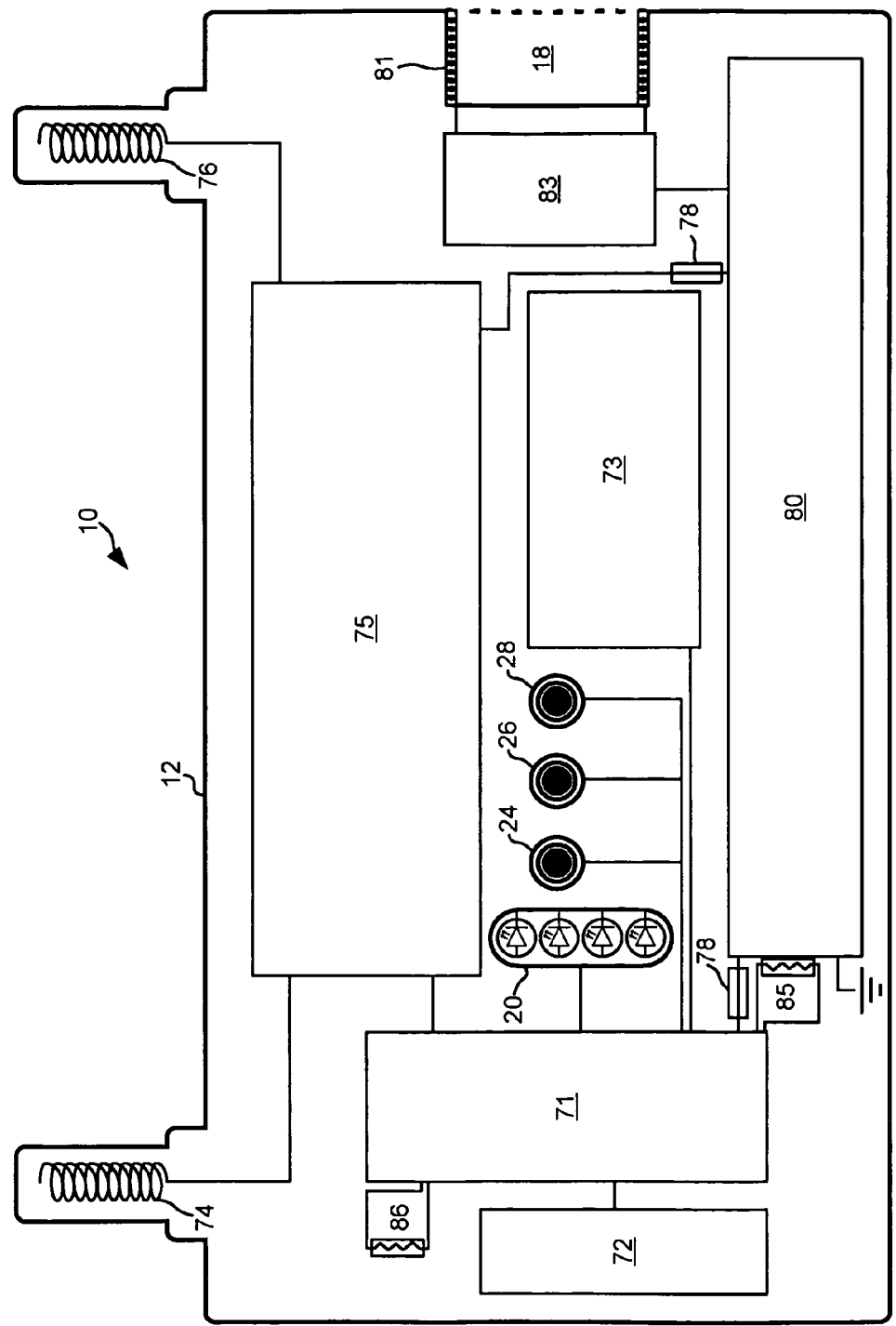
FIG. 5 is a component block diagram of a portable explosion-proof communication relay module embodiment.

Example components of an explosion-proof communication relay module 10 embodiment are illustrated in FIG. 5. As described above, all of the circuit and metal components are enclosed within a nonconductive housing 12 which forms a more or less airtight seal to prevent the internal component from being exposed to the external explosive atmosphere. The explosion-proof communication relay module 10 may contain a programmable processor 71, such as a microprocessor, microcomputer or microcontroller, which serves as the overall controller for the module. Coupled to the processor 71 may be a memory 72 for storing configuration software and data, a display 73 which may be a liquid crystal display 22 or a touchscreen 32, various LED indicators 20, and user input elements such as pushbuttons 24, 26, 28. Also coupled to the processor 71 is a radio receiver and relay circuit 75 which is coupled to first and second antennas 74, 76. Elements of the radio receiver and relay circuit 75 are described below with reference to FIG. 6. Providing power to the processor 71 and the radio receiver and relay circuit 75 is an internal battery 80. As illustrated, the battery may be rechargeable with recharging power provided by an induction coil 81 which is positioned within the charging receptacle 18 and coupled to a rectifier and charge control circuit 83.

In order to ensure the explosion-proof communication relay module 10 is safe to operate in an explosive environment, the internal circuitry includes safety features which may not be required in other communication devices. These safety devices include fault isolation circuit elements, such as sealed fuses 78, which in the event of a short-circuit or similar fault will isolate the battery 80 from the fault. While sealed fuses 78 are shown in FIG. 5, any of a variety of other known fault tolerant circuit elements may be implemented in the design so as to ensure that a short-circuit cannot generate a temperature high enough to ignite explosive vapors. In addition to self acting isolation circuitry such as fuses 78, the processor 71 may be configured with software to monitor voltage and current through a variety of circuit elements and activate cut off switches or relays that can isolate overheating or faulted circuitry.

The explosion-proof communication relay module 10 may also include internal temperature sensors, such as thermistors 85, 86 to monitor the temperature of the battery and other internal electronics. For example, most rechargeable batteries generate heat during the charge or discharge cycle. By using temperature indicating readings received from a thermistor 85 coupled to the battery 80, the processor 71 can monitor charging and discharging cycles, such as to terminate charging once the battery reaches a fully charged or elevated temperature condition. Additionally, the processor 71 may monitor battery temperature to assess the condition of the battery to protect against the possibility of overheating or explosion as has been known to occur in some battery types. The processor 71 may be configured with software to present an alarm to users when the battery temperature or performance indicates that the battery 80 poses a threat of overheating or fire. Similarly, the processor 71 may monitor internal temperatures using other thermistors 86 to determine whether any of the electronics are overheating or if the module itself is in a overheat condition, such as in the presence of external fire. A processor 71 may be configured with software to take preventative actions to limit damage to the module in the event of overheating, including generating audible or visual alarms or transmitting signals via one or both of the antenna 74, 76.

Figure 6:
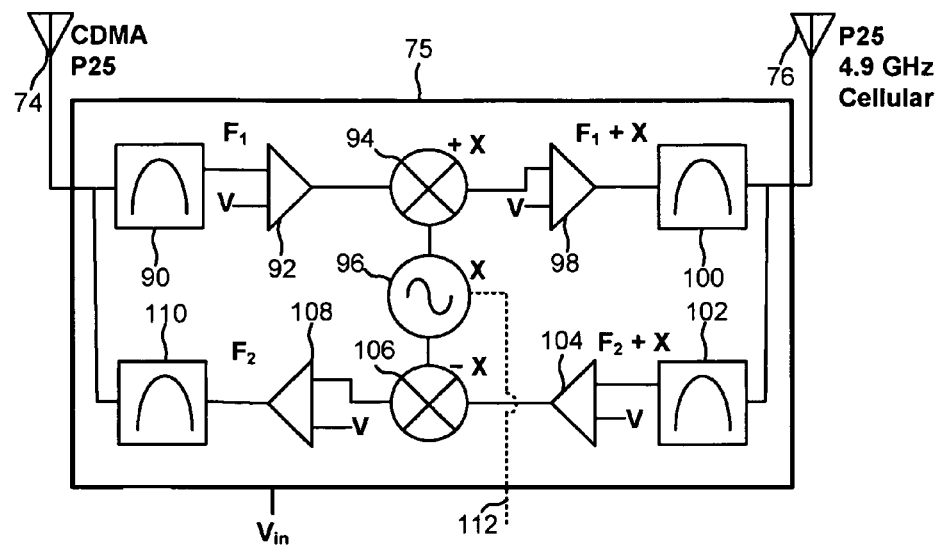
FIG. 6 is a circuit block diagram of a radio receiver and relay circuit embodiment suitable for use in an explosion-proof communication relay module.

An example of a circuit design that may be implemented in the radio receiver and relay circuit 75 is illustrated in FIG. 6. The purpose of the circuit is to receive radio frequency signals at a first frequency and retransmit the information contained within those signals at a second frequency. Thus, cellular signals received in the in the first antenna 74 may be a converted to a frequency of approximately 4.9 GHz and retransmitted from the second antenna 76. Similarly, signals received at approximately 4.9 GHz in the second antenna 76 may be down-converted to the frequency of cellular signals and retransmitted from the first antenna 74.

The determination of whether the unit relays the signal or is designated as a end node providing cellular communication can be determined by the user interface on the device or via remote telemetry control.

In the example embodiment illustrated in FIG. 6, signals received from the first antenna 74 are filtered in an input band pass filter 90 configured to select frequencies from transmitters within the communication system. The band pass filter 90 may be configurable or may be provided in a bank of alternative band pass filters that can be selected in order to tune the radio receiver portion of the relay module 75 to different types of communications. For example, separate band pass filters 90 may be provided to receive CDMA cellular communication frequencies (i.e., 824 MHz and 890 MHz frequencies) and alternatively to receive signals from P25 radios (i.e., in either the 700 or 800 MHz frequencies). The input band pass filter 90 may be tuned or selected when the explosion-proof communication relay module 10 is configured for use, such as by an operator selecting the frequency of the input signals. Output from the band pass filter 90 of frequency $F_1$ may be amplified in an amplifier 92 and then provided to a mixer 94 which up or down converts the received signal onto a different frequency X provided by a frequency generator 96. As result of this modulation, an output signal is generated having a frequency of $F_1+X$ which includes all of the information in the received signal. This output signal may be amplified by an amplifier 98 and then filtered by an output band pass filter 100 which illuminates noise and frequency elements outside the desired transmission band prior to the signal being applied to the second antenna 76. As result of these circuit elements, the incoming frequency received on the first antenna 74 in frequency $F_1$ is retransmitted from the second antenna 76 with a frequency of $F_1+X$.

The frequency of the frequency generator 96 may be controlled such as by a lead on housing 12 coupled to the processor 71 so as to tune the output frequency to a desired frequency band. Similarly, the output band pass filter 100 may be tunable or provided in a bank of alternative band pass filters to enable the module to output signals at a variety of different frequencies. For example, output signals may be transmitted at the frequencies of P25 radios, at another arbitrary frequency, such as 4.9 GHz, or at cellular telephone frequencies.

In a similar manner, signals received on the second antenna 76 may be down-converted to a first frequency in the circuit elements 102-110 within the radio receiver and relay circuit 75. Signals received on the second antenna 76 may be filtered in an incoming band pass filter 102 configured (e.g., by being tuned or selected from a bank of filters) to filter out all but the intended frequencies. As with the input band pass filter 90, the input band pass filter 102 coupled to the second antenna 76 may be tuned or selected when the explosion-proof communication relay module 10 is configured for use, such as by an operator selecting the relay frequency. Output from the band pass filter 102, which may have a frequency $F_2$, may be amplified an amplifier 104 and then provided to a mixer 106 which decreases the frequency of the signal by the frequency of the frequency generator 96 to provide an output having a frequency of $F_2-X$. This output signal may be amplified in an amplifier 108 and filtered by an output band pass filter 110 prior to being applied to the first antenna 74. As with the other band pass filters, the output band pass filter 110 may be tunable or selected from a number of different band pass filters in order to output signals within a desired frequency range which may be selected by an operator when the explosion-proof communication relay module 10 is configured for use.

Figure 7:
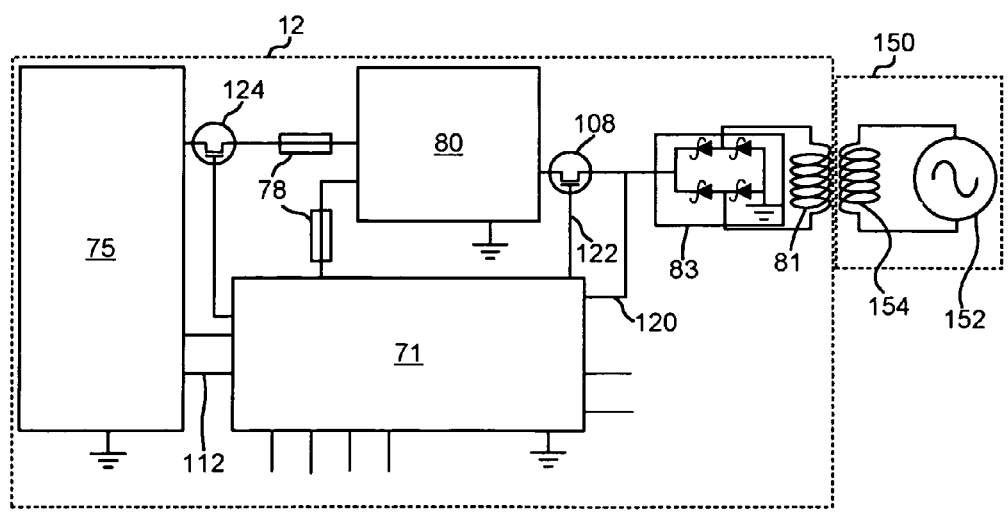
FIG. 7 is a circuit block diagram of a portion of the circuitry of the embodiment illustrated in FIG. 5.

Elements of the explosion-proof communication relay module 10 circuitry are illustrated in the circuit diagram shown in FIG. 7. As described above, the processor 71 can serve as the overall function controller for the module. For example, by activating or deactivating switch transistors 108 and 124, the processor 71 can control whether the battery receives charging and whether the radio receiver and relay circuit 75 receives power from the battery. For example, to turn on the radio receiver and relay circuit 75 the processor 71 can provide voltage to the transistor 124 which when energized enables voltage to flow from the battery 80 to the radio receiver and relay circuit 75. As noted above, fault tolerant circuits elements, such as a sealed fuse 78, may also be provided in the lead from the battery 80 to ensure that if a fault exists in the radio receiver and relay circuit 75 or transistor 124 and that overheating of the circuitry will not occur. Additionally, the processor 71 may configure the input and output frequencies to which the radio receiver and relay circuit 75 are tuned such as by applying signals to control lead 112.

The processor 71 may also control the charging of the battery 80 by energizing or de-energizing a power connection transistor 108 by means of a control lead 122. During charging, a charging plug 150 is brought into close proximity with the induction coil 81 within the charging receptacle 18. An alternating voltage source 152 is applied to a charging coil 154 which generates an oscillating magnetic field. The oscillating magnetic field induces an alternating current in the induction coil 81. This alternating current is rectified in a rectifier circuit 83 to provide a DC voltage source that can be used to charge the battery 80. The processor 71 can determine that the charging plug 150 is engaged and energized by sensing the rectifier output voltage on a lead 120. If the battery is in need of charging, which may be determined by measuring voltage or other parameters from the battery 80 using circuit elements not shown in FIG. 7, the processor can apply a voltage to lead 122 which enables the transistor 108 to apply the rectifier output voltage to the battery 80. The processor 71 may monitor the battery's condition, including output voltage and temperature (via thermistor 85), in order to determine when a full charge condition exists. Once a full charge condition is determined, the processor 71 may periodically alternatively energize and de-energize the transistor 108 to boost the charge on the battery in order to maintain the battery in a full charge state.

Figure 8:
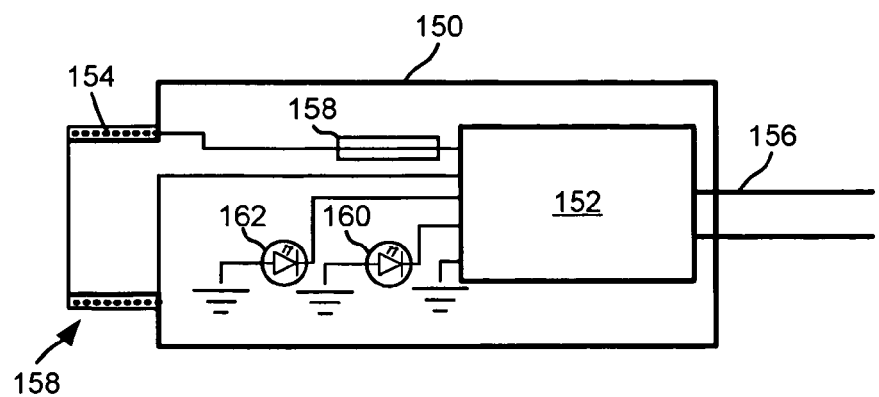
FIG. 8 is component block diagram of a charging plug compatible with the explosion-proof communication relay module embodiment illustrated in FIG. 5.

An example embodiment of the charging plug 150 suitable for charging the explosion-proof communication relay module 10 is illustrated in FIG. 8. As mentioned above, the charging plug 150 includes a charging coil 154 which is coupled to an alternating voltage source which is provided by a signal generator 152. The charging coil 154 is positioned within a plug portion 158 which is sized to fit snugly into the charging receptacle 18 within the explosion-proof communication relay module 10. Power for the signal generator 152 may be provided by an external power source such as 60 Hz AC power provided by a power cord 156. The signal generator 152 generates an alternating current signal with a frequency configured to achieve efficient transfer of energy between the charging coil 154 and the induction coil 81 located on the explosion-proof communication relay module 10. The charging plug 150 may also include fault protection circuitry, such as a sealed fuse 158, to protect against damage to the equipment in the event of a fault in the charging coil 154. Additionally, the charging plug 150 may include one or more status indicators, such as LEDs 160, 162, to indicate various states, such as when power is applied and charging is initiated. The signal generator 152 may include a microprocessor circuit (not shown) to detect when power is being transferred to the induction coil 81, such as by measuring a voltage drop or change in induction across the charging coil 154, and limit power applied to the charging coil 154 when charging is not being accomplished. The charging plug 150 may also include sensors not shown in FIG. 8 to detect when the charging plug is positioned in the explosion-proof communication relay module 10, such as contact switches or proximity switches (e.g., a magnetic reed switch activated by a magnet in the housing 12 of the explosion-proof communication relay module 10).

To charge the battery of the explosion-proof communication relay module 10, a user inserts the plug portion 158 of the charging plug 150 into the charging receptacle 18 and then applies power to the signal generator 152 such as by plugging the power cord 156 into a conventional electrical power outlet. Since the charging plug may require external power, such as conventional AC power, which will necessarily require external electrical contacts, it is anticipated that the charging cycle will be accomplished in a safe environment, such as prior to use of the explosion-proof communication relay module 10 in an explosive environment.

Figure 9:
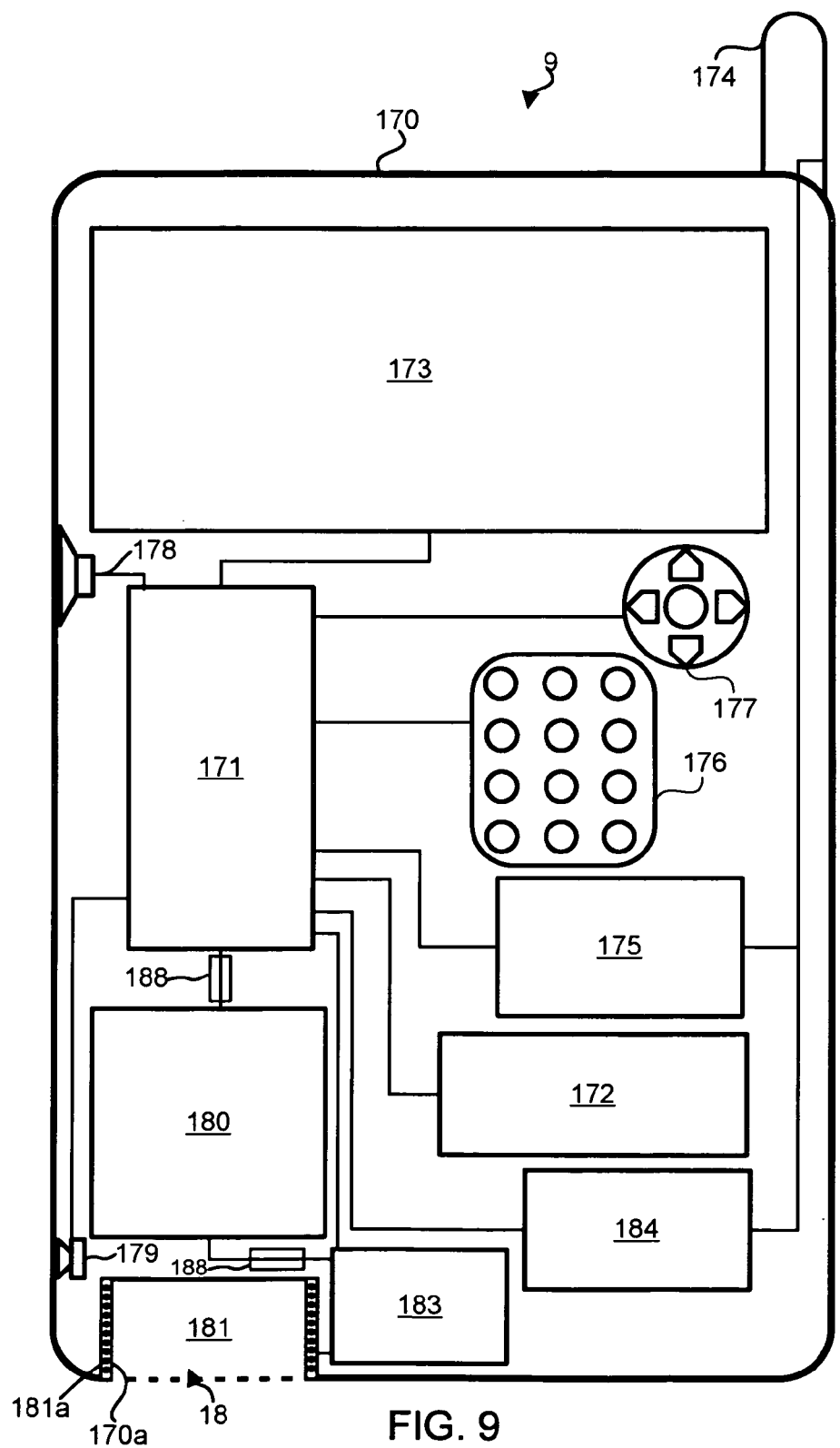
FIG. 9 is a component block diagram of an explosion-proof cellular telephone according to an embodiment.

In order to use a cellular telephone device in an explosive environment, it is necessary to ensure the cellular telephone is explosion-proofed so it cannot initiate an explosion, such as by generating a heat source or spark. Accordingly, an embodiment provides an explosion-proof cellular telephone 9, an example of which is illustrated in FIG. 9. An explosion-proof cellular telephone 9 includes a hermetically sealed housing 170 enclosing a processor 171 coupled to internal memory 172 and a display 173, and an antenna 174 for sending and receiving electromagnetic radiation that is connected to a wireless data link and/or cellular telephone transceiver 175 coupled to the processor 171. An explosion-proof cellular telephone 9 also will include a key pad 176 or miniature keyboard and menu selection buttons or rocker switches 177 for receiving user inputs. To minimize sources for ignition, the miniature keypad 176 and selector switch 177 are hermetically sealed within the housing 170 by a flexible membrane, such as a thin, flexible plastic sheet covering the buttons and switches, so that the buttons can be manipulated through the membrane without exposing contacts to the exterior atmosphere.

To output sound, a speaker 178 is coupled to the processor 171. In some implementations, the speaker 178 may be coupled to a vocoder circuit (not shown) which is coupled to the processor 171. To eliminate ignition sources, the speaker 178 is hermetically sealed within the housing 170 by a flexible membrane, such as a thin, flexible plastic sheet, configured so that sound waves may penetrate the thin, flexible plastic sheet but there are no electrical or metal contacts exposed to the exterior atmosphere. In an embodiment, the sealing flexible membrane may be part of the speaker membrane itself. To receive sound, a microphone 179 is coupled to the processor 171 or to a vocoder circuit (not shown) which is coupled to the processor 171. To eliminate ignition sources, the microphone 179 is hermetically sealed within the housing 170 by a flexible membrane, such as a thin, flexible plastic sheet, configured so that sound waves may penetrate the thin, flexible plastic sheet but there are no electrical or metal contacts exposed to the exterior atmosphere. Additionally, the explosion-proof cellular telephone 9 may include a secondary transceiver, such as a Bluetooth® transceiver 184 coupled to the antenna 174.

To further ensure there are no metal contacts or ignition sources exposed to the atmosphere, the explosion-proof cellular telephone 9 is powered by an internal battery 180 completely contained within the housing 170. The battery 180 may be any rechargeable battery, such as a nickel hydride or nickel cadmium battery. To eliminate ignition sources, the battery 180 in this embodiment is charged by an inductor circuit including an inductor coil assembly 181 coupled to an internal rectifier charging circuit 183 which is coupled to the battery 180. In an embodiment, the inductor coil assembly 181 includes an induction coil 181a contained within a thin wall portion 170a of the housing 170 that forms the sealed internal volume of the charging receptacle 181 into which a charging plug 208 (see FIG. 10) containing a charging coil 204 can be inserted. The shape of the induction coil 181a, charging receptacle 181, charging plug 208 and charging coil 204 are configured to fit closely together, thereby ensuring good magnetic coupling between the induction coil 181a and charging coil 204. As discussed above with reference to FIGS. 7 and 8, charging of the battery 180 is accomplished by a inserting a charging plug 280 into the sealed internal volume 181 and applying an oscillating electric field to the charging coil 204. The oscillating electric field in the charging coil 204 induces a corresponding oscillating field in the induction coil 181a which is rectified and regulated in the charging circuit 183 which applies a voltage to the battery 180. The charging circuit 183 includes a rectifier similar to the rectifier 83 described above with reference to FIG. 7, as well as a charge regulating circuit that ensures that the battery 180 is not overcharge, such as by disconnecting voltage to the battery 180 when a full charge state is achieved. As discussed above with reference to FIGS. 7 and 8, the charge regulating circuit can determine when a full charge state exists in the battery 180 using a number of measurements, such as temperature, voltage and resistance as are well known in the art. The charge regulating circuit can also be configured to trickle charge the battery 180 when a full charge state exists. The charging regulator circuit may be monitored or controlled by the processor 171, or it may be a separate processor circuit configured to perform the charge regulating functions.

To protect against the possibility that a circuit fault could lead to high temperatures or a spark that might ignite an explosion, the explosion-proof cellular telephone 9 will also include fault tolerant circuitry. A variety of fault tolerant circuit elements may be included, such as a sealed fuse 188 coupled to each lead connected to the battery 180. Such a sealed fuse 188 is configured to disconnect any time a short circuit fault in any of the telephone circuitry could lead to an excessive drain on the battery 180 sufficient to generate excessive heat or a spark. Other fault tolerant circuitry elements may be used. Additionally, each of the electrical components within the housing 170 is electrically insulated from the housing 170 so that a fault in any electronic element will not result in a voltage on the exterior of the housing 170.

The processor 171 may be any programmable microprocessor, microcomputer or multiple processor chip or chips that can be configured by software instructions (applications) to perform a variety of functions associated with the normal functioning of a cellular telephone. The processor 171 may be configured with software stored in the internal memory 172 to minimize transmission power consistent with a minimum quality of service. A typical cellular telephone operating in a cellular telephone network sets its transmission power level in accordance with instructions received from the base station. In order to ensure the that the explosion-proof cellular telephone 9 does not generate too high of a power level in attempting to establish communications with a base station 1 or explosion proof communications relay modules 10, the processor 171 may be configured to limit power to a safe level when operating in an explosive environment. Thus, the explosion-proof cellular telephone 9 may configured with an operating mode that can be selected by a user using a menu function in which actual output power is limited to a safe maximum level even if the quality of service received is below a normally acceptable standard. Additionally, the processor may be configured with software to provide information to the user regarding the signal strength received from a relay device so that the user can be informed when it is time to lay down another set of relay modules 10

Figure 10:
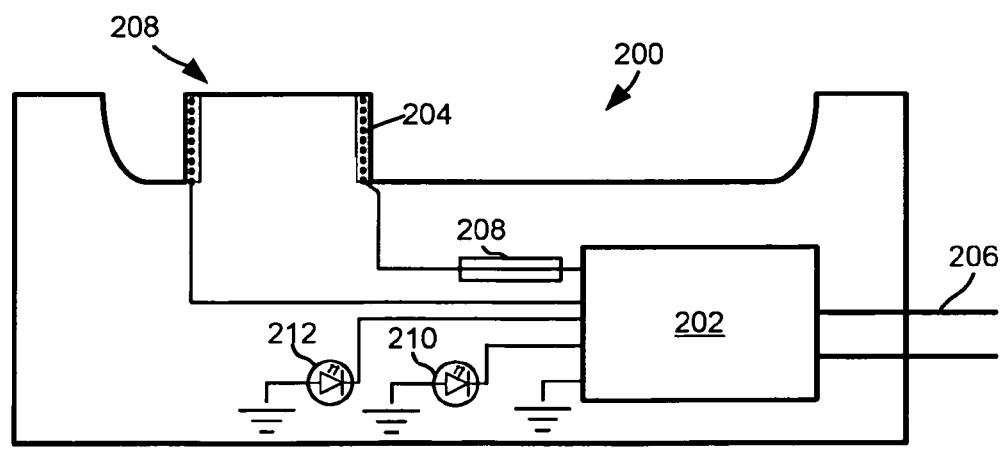
FIG. 10 is component block diagram of a charging stand compatible with the explosion-proof cellular telephone embodiment illustrated in FIG. 9.

An example embodiment of a charging stand 200 suitable for charging the explosion-proof cellular telephone 9 is illustrated in FIG. 10. The charging stand 200 includes a charging coil 204 which is coupled to an alternating voltage source which is provided by a signal generator 202. The charging coil 204 is positioned within a plug portion 208 which is sized to fit snugly into the charging receptacle 181 within the explosion-proof cellular telephone 9. Power for the signal generator 202 may be provided by an external power source such as 60 Hz AC power provided by a power cord 206. The signal generator 202 generates a alternating current signal with a frequency configured to achieve efficient transfer of energy between the charging coil 204 and the induction coil 181a. The charging stand 200 maybe conformably designed to match the bottom surface of the explosion-proof cellular telephone 9 so that charging can occur while the phone is resting in the stand. The charging stand 200 may also include fault protection circuitry, such as a sealed fuse 208, to protect against damage to the equipment in the event of a fault in the charging coil 204. Additionally, the charging stand 200 may include one or more status indicators, such as LEDs 210, 212, to indicate various states, such as when power is applied and charging is initiated. The signal generator 202 may include a microprocessor circuit to detect when power is being transferred to the induction coil 181a, such as by measuring a voltage drop or change in induction across the charging coil 204, and limit power applied to the charging coil 204 when charging is not being accomplished. The charging stand 200 may also include sensors not shown in FIG. 10 to detect when the explosion-proof cellular telephone 9 is positioned in the charging stand, such as contact switches or proximity switches (e.g., a magnetic reed switch activated by a magnet in the housing 170 of the explosion-proof cellular telephone 9).

To charge the explosion-proof cellular telephone 9, a user simply inserts the telephone into the charging stand 200 so that the plug assembly 208 properly engages the charging receptacle 181, and then applies power to the signal generator 202 such as by plugging the power cord 206 into a conventional power outlet. Since the charging stand 200 may require external power, such as conventional AC power, which will necessarily require external electrical contacts, it is anticipated that the charging cycle will be accomplished in a safe environment, such as prior to use of the explosion-proof cellular telephone 9 in an explosive environment.

While the foregoing description addresses an explosion-proof cellular telephone, the same design elements may be implemented to provide an explosion-proof mobile communication device, such as a two-way radio or a miniature computer with communication capabilities. Thus, the references in this description to an explosion-proof cellular telephone are not intended to limit the invention or the scope of the claims to cellular telephones per se, and the descriptions should be interpreted as encompassing any mobile device which implements the recited elements related to explosion-proofing.

Figure 11:
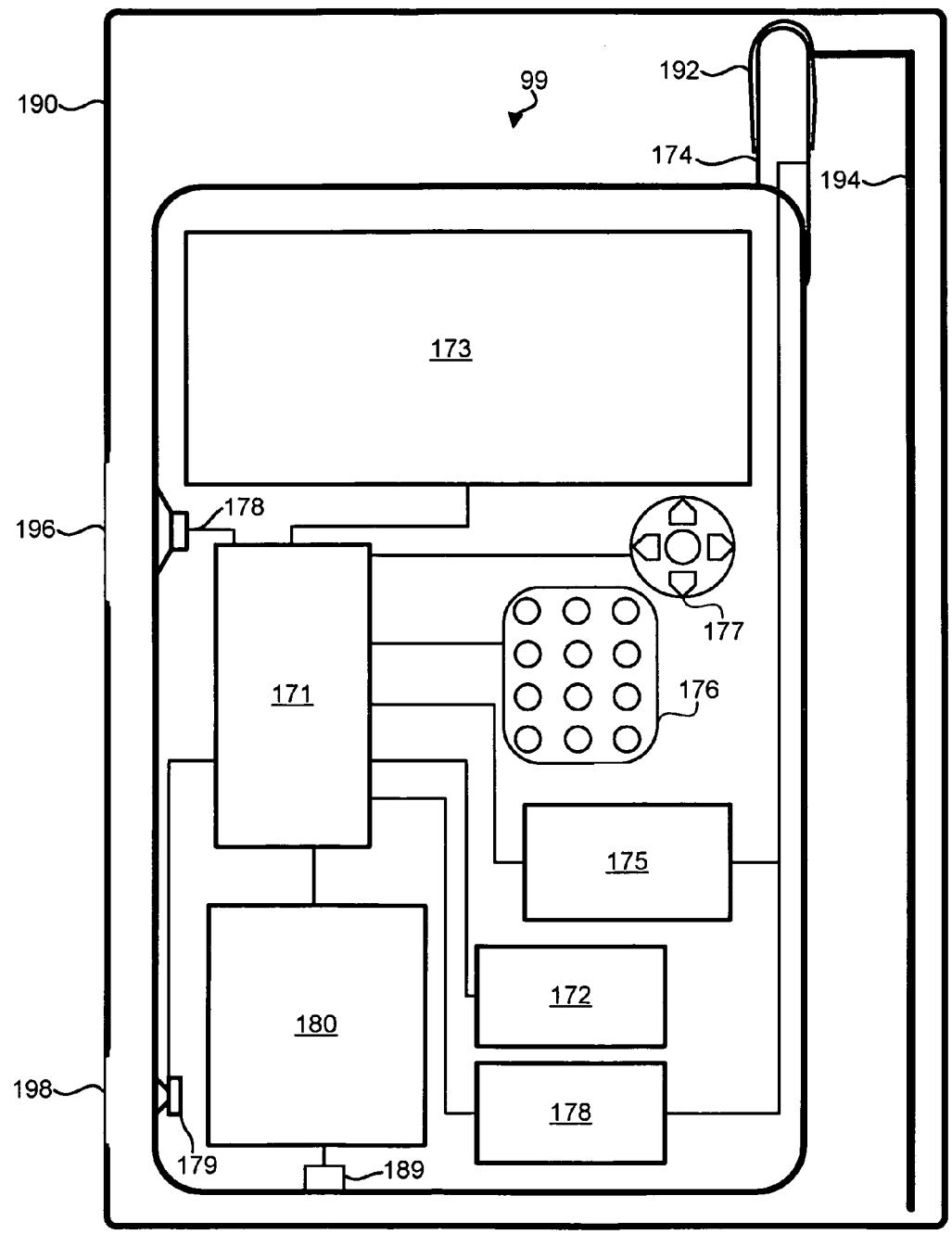
FIG. 11 is a component block diagram of an explosion-proofing container for a cellular telephone according to an embodiment.

Conventional cellular telephones and other mobile communication devices may be used in an explosive environment if they are sealed within an airtight container that prevents any internal circuitry or metal contacts from coming into contact with the external explosive atmosphere. An embodiment for providing such an adaptive container is illustrated in FIG. 11. This embodiment includes an airtight housing 190 which is configured to enclose a typical cellular telephone 99. The housing 190 is formed from a non-metallic, non-conducting plastic, rubber, Plexiglas® or fiberglass material. In a preferred embodiment, the housing 190 is made from a transparent and shock resistant Plexiglas® so that a user can view the display 173 through the housing 190. The housing 190 may be hinged on one side so that it can open like a clamshell to receive the cellular telephone 99, closing with a clasp and airtight seal. Alternatively, the housing 190 may have a side or cap portion that can be removed to permit placement of the cellular telephone 99 into the housing 190 and then closed and sealed, such as by a snap fit, threaded fasteners (such as nylon screws), a clasp closure, or other known ceiling and locking mechanism.

The housing 190 may include an antenna coupling 192 connected to an internal antenna 194. The antenna coupling may be in the form of a metal cap configured to receive electromagnetic radiation emitted from the antenna 174 and transfer that energy to the internal antenna 194.

In order to enable sound to penetrate the housing 190, a thin wall section 196 may be provided in the housing 190 in close proximity to the telephone speaker at 178. The thin wall section 196 may be fabricated from a thin polymer or plastic which is able to vibrate in response to sound waves emitted by the speaker 178 so as to transmit sound to the exterior. Similarly, a thin wall section 198 may be provided in the housing 190 in close proximity to the microphone 179. This thin wall section 198 may also be fabricated from a thin polymer or plastic film which is able to vibrate in response to sound waves on the exterior of the housing 190 and transmit that sound into the interior so that it can be received by the microphone 179. In both cases, the thin wall section 198 prevent any electrical or metal contact exposure from the mobile device 99 to the exterior atmosphere.

In order to enable the manipulation of buttons on the cell phone, a thin flexible membrane (not shown separately) may be positioned over the keypad 176 and selector switch 177. Preferably, the thin flexible membrane is transparent so that a user can view the keys being pressed. The thin flexible membrane is part of the airtight housing 190, and thus may bonded, glued or otherwise affixed to the housing 190 in an airtight manner.

A conventional cellular telephone 99 may include components similar to the like numbered components described above with reference to FIG. 9, with the exception that the battery 180 may be connected to a charging receptacle 189 for receiving charging power from an external charging device, and the rectifier charging circuit 183 may be eliminated. Additionally, the circuitry may not include the fault tolerant circuitry (e.g., fuse elements 188) necessary in an explosion-proof cellular telephone 9.

The explosion-proof housing 190 may also be implemented with any mobile device, such as a cellular telephone, two-way radio, portable computer, etc.

In addition to sealing electronics and metal within a non-metallic housing 12 and including fault tolerant circuits and elements within the system design, further protection against initiating an explosion can be provided in the operational programming of the explosion-proof communication relay module processor 71. For example, the processor 71 can be configured with software instructions to transmit electromagnetic radiation at the lowest power level consistent with a minimum quality of service received by linked mobile devices. Minimizing the transmission power minimizes the potential that transmitted electromagnetic radiation will induce currents in nearby metal sufficient to cause arching.

Figure 12:
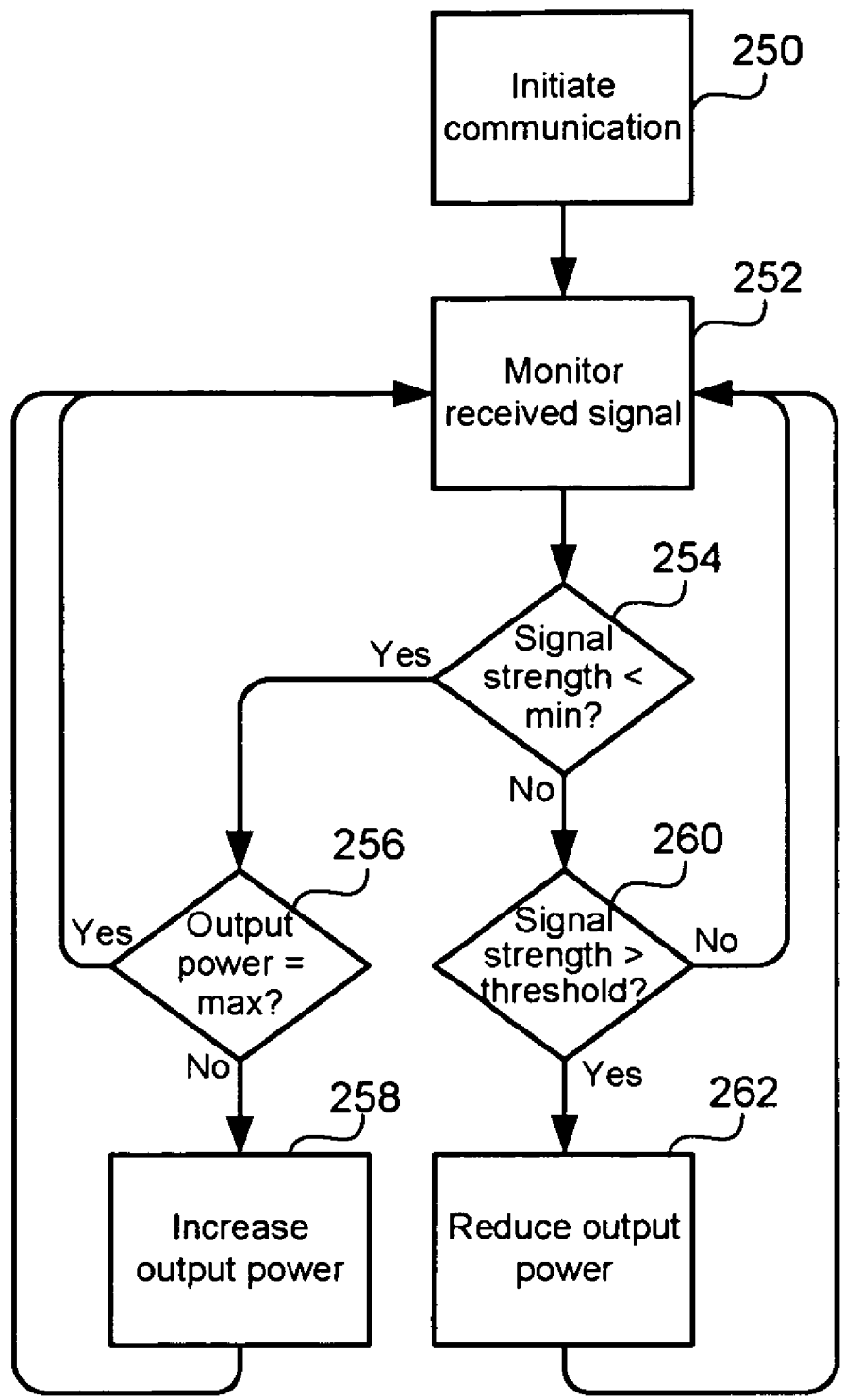
FIG. 12 is a process flow diagram of an embodiment method for regulating the output power transmitted by an explosion-proof communication relay module.

An example embodiment of method steps that can be implemented for this purpose in the processor 71 are illustrated in FIG. 12. Upon initiating communication operations, step 250, the processor 71 may receive signals from the radio receiver and relay circuit 75 indicating a signal strength or providing other quality of service metrics related to the communication links to explosion-proof cellular telephones 9, step 252. In doing so, the processor 71 may test whether the signal strength or other quality of service metric is greater than a minimum threshold, test 254. The processor 71 can monitor factors such as the bit-error-rate in signals received from explosion-proof cellular telephones 9 (or mobile devices 99 within an explosion-proof container), and may receive reports of received signal quality provided by linked explosion-proof cellular telephones 9. Conventional cellular telephones are configured to request an increase in transmission power when signal strength or bit-error-rates fall below a certain threshold. Thus, the processor 71 may also monitor requests for signal strength increases from linked explosion-proof cellular telephones 9 in order to assess the quality of the communication link. If the received signal strength or other quality of service metric is less than a minimum acceptable standard, (i.e., test 254="Yes"), the processor 71 can test whether the transmission output power is already at a maximal safe level for transmission in an explosive environment, test 256. If the transmitter output power is already at the maximum safe transmission power level (i.e., test 256="Yes"), no action may be taken and the processor may simply return to monitoring received signals, returning to step 252. However, if the transmitter output power is less than the maximum safe level (i.e., test 256="No"), the processor 71 may signal the radio receiver and relay circuit 75 to boost the output power, step 258.

If the signal strength or other quality of service metric is greater than the minimum acceptable value (i.e., test 254="No"), the processor may determine whether the signal strength or quality of service metric is greater than some acceptable threshold, test 258. If the signal strength or quality of service metric is not greater than the acceptable threshold (i.e., test 258="No"), then the processor may return to the step of monitoring received signals, returning step 252. However, if the signal strength is greater than the acceptable threshold (i.e., test 254="Yes"), the processor 71 can direct the radio receiver and relay circuit 75 to reduce the transmitter output power level, step 260. After adjusting the transmitter output power, steps 256 or 260, the processor 71 returns to the step of monitoring the received signal, step 252. By performing this routine repeatedly, and as frequently as several times per second, the processor 71 can ensure that the transmitter output power is no greater than necessary to achieve minimum acceptable in quality of service communications. The acceptable threshold for signal strength or other quality of service metric may be set at a low level such that the relay provides minimally acceptable communications quality in order to ensure that the very lowest transmission output power is utilized. Thus, the algorithm illustrated in FIG. 12 can be configured with parameter settings, such as the maximum safe output power and the acceptable threshold for signal strength or other quality of service metric, to ensure that a safe level of transmission output power is used at all times while the explosion-proof communication relay module 10 is operating in an explosive environment.

Figure 13:
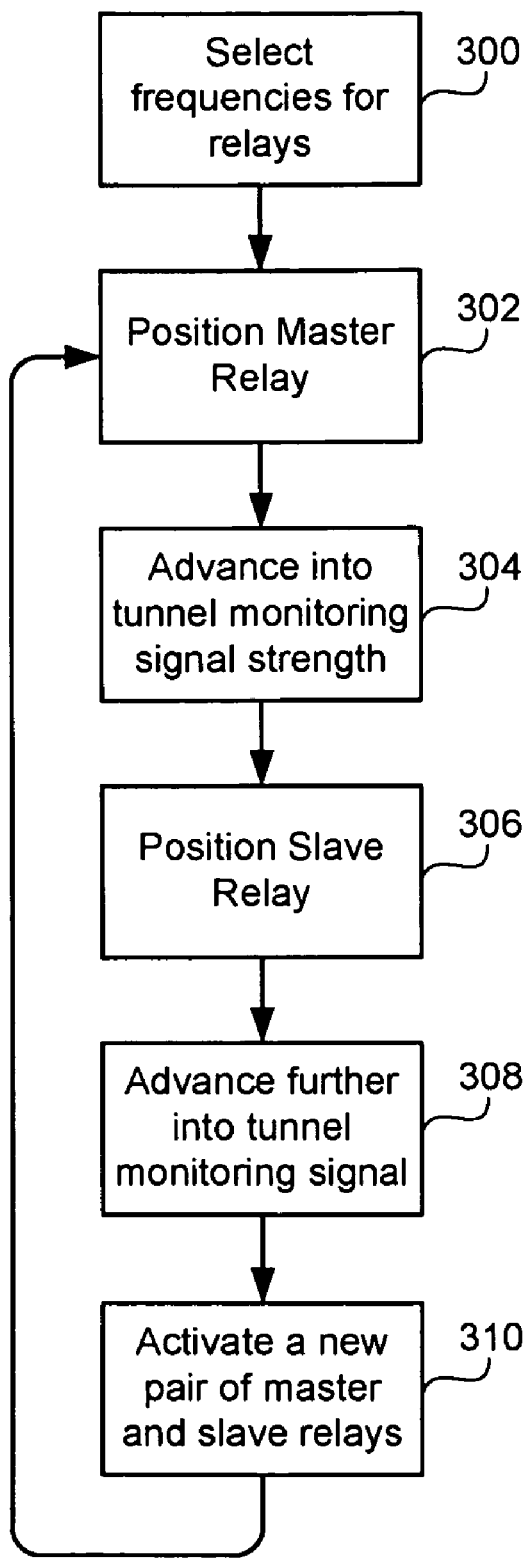
FIG. 13 is a process flow diagram of an example of the steps that may be implemented when deploying explosion-proof communication relay modules in an operational situation.

The various embodiments provide a communication relay system that can easily be configured and deployed in an explosive environment. An example of steps that may be implemented in using an embodiment is illustrated in FIG. 13. Before entering an explosive environment, users may select input and relay frequencies to be used by the relay modules 10, step 300. By actuating user input elements, such as pushbuttons 24, 26, 28, users can configure the frequencies to be received and the relay frequency to be used by the modules. Thus, the modules can be configured to work with a particular set of communication devices, such as P25 radios or explosion-proof cellular telephones 9. With the explosion-proof communication relay modules 10 configured, the emergency response personnel can venture into the explosive environment and positioned a first master relay at a position where it can receive signals from a base station, step 302. In a situation involving entry into tunnels or mineshaft, the master relay may be positioned at the opening of the tunnel or mine. Users can then proceed into the explosive environment carrying a slave relay while monitoring its received signal strength, step 304. While carrying the slave relay, users can communicate with their mobile devices which will send and receive signals to the slave relay. When signal strength received by the slave relay reaches a minimum threshold, such as when users advanced far enough into the tunnel or mine so that the master relay's signal is attenuated to a minimum threshold, users can position the slave relay at that point, step 306. Users can then advance further into the tunnel using their mobile communication device while monitoring its received signal strength, step 308. If users find that the signal strength drops to a marginal level, users can then activate another pair of master and slave relays, step 310. The users can then position the newly activated master relay at a position where it can reliably receive signals from the first slave relay, repeating step 302, and then continue advancing into the tunnel or mine repeating steps 304-310 as necessary.

In the foregoing descriptions of the various embodiments the communication systems are described as including explosion-proof cellular telephones 9 which may be any explosion-proof mobile device. However, one of skill in the art will appreciate that the explosion-proof communication relay modules 10 may be used with non-explosion-proof mobile devices when not used in an explosive environment. Thus, while the explosion-proof communication relay modules 10 enable safe and effective communications in explosive environments, they will work equally effectively in non-explosive environments with any mobile devices (explosion-proof or not) which operate at compatible communication frequencies.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order.

The hardware used to implement the foregoing embodiments may be processing elements and memory elements configured to execute a set of instructions, including microprocessor units, microcomputer units, programmable floating point gate arrays (FPGA), and application specific integrated circuits (ASIC) as would be appreciated by one of skill in the art, wherein the set of instructions are for performing method steps corresponding to the above methods. Alternatively, some steps or methods may be performed by circuitry that is specific to a given function.

Those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The steps of a method or algorithm described in connection with the embodiments disclosed herein may be embodied directly in hardware, in a software module executed by a processor, or in a combination of the two. The software module may reside in a processor readable storage medium and/or processor readable memory both of which may be any of RAM memory, flash memory, ROM memory, EPROM memory, EEPROM memory, registers, hard disk, a removable disk, a CD-ROM, or any other tangible form of data storage medium known in the art. Moreover, the processor readable memory may comprise more than one memory chip, memory internal to the processor chip, in separate memory chips, and combinations of different types of memory such as flash memory and RAM memory. References herein to the memory of a mobile handset are intended to encompass any one or all memory modules within the mobile handset without limitation to a particular configuration, type or packaging. An exemplary storage medium is coupled to a processor in either the mobile handset or the theme server such that the processor can read information from, and write information to, the storage medium. In the alternative, the storage medium may be integral to the processor. The processor and the storage medium may reside in an ASIC.

The foregoing description of the various embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein, and instead the claims should be accorded the widest scope consistent with the principles and novel features disclosed herein

I claim:

1. An explosion-proof communication relay module, comprising:
   a non-metallic housing;
   a processor;
   a first antenna and a second antenna both positioned completely within the housing;
   a radio receiver and relay circuit coupled to the processor, the first antenna and the second antenna, the radio receiver and relay circuit configured to receive radio frequency signals from the first antenna at a first frequency and retransmit the received signals from the second antenna at a second frequency different from the first frequency;
   a battery coupled to the processor and to the radio receiver and relay circuit, wherein the battery is rechargeable;
   an induction coil coupled to a rectifier coupled to the battery, wherein the induction coil and rectifier are configured to generate a voltage which can be used to charge the battery when an alternating magnetic field is applied to the induction coil;
   a fault tolerant circuit element coupled to the battery; and
   a transistor coupled between the rectifier and the battery with a control lead coupled to the processor, wherein the processor, first antenna, second antenna, radio receiver, relay circuit, battery and fault tolerant circuit element are all positioned completely within the non-metallic housing, and wherein the processor is configured with processor-executable software instructions to regulate charging of the battery when the voltage is generated by the induction coil and rectifier.

2. The explosion-proof communication relay module of claim 1, wherein the radio receiver and relay circuit comprises:
   a signal generator for generating a signal having a third frequency;
   a first mixer circuit coupled to the first and second antenna and to the signal generator, the first mixer circuit configured to receive radio frequency signals from the first antenna at the first frequency and output the second frequency radio frequency signal to the second antenna wherein the second frequency equals a sum of the first frequency and the third frequency; and
   a second mixer circuit coupled to the first and second antenna and to the signal generator, the second mixer circuit configured to receive radio frequency signals from the second antenna at the second frequency and output the first frequency radio frequency signal to the first antenna wherein the first frequency equals the second frequency minus the third frequency.

3. The explosion-proof communication relay module of claim 2, wherein the signal generator is coupled to the processor and configured to adjust the third frequency in response to signals received from the processor.

4. The explosion-proof communication relay module of claim 1, wherein the processor is configured with processor-executable software instructions to perform steps comprising controlling an output power of the radio receiver and relay circuit to maintain the output power at a minimum level consistent with a minimum quality of the service metric and below a maximum output power level.

5. The explosion-proof communication relay module of claim 1, wherein:
   the first frequency is a cellular telephone frequency; and
   the second frequency is approximately 4.9 GHz.

6. The explosion-proof communication relay module of claim 1, wherein:
   the first frequency is a two-way radio frequency; and
   the second frequency is approximately 4.9 GHz.

7. An explosion-proof communication mobile device, comprising:
   a non-metallic housing;
   a processor;
   an antenna;
   a transceiver coupled to the processor and to the first antenna;
   a rechargeable battery coupled to the processor and to the transceiver;
   an induction coil coupled to a rectifier coupled to the rechargeable battery, wherein the induction coil and rectifier are configured to generate a voltage which can be used to charge the rechargeable battery when an alternating magnetic field is applied to the induction coil;
   a fault tolerant circuit element coupled to the rechargeable battery; and
   a transistor coupled between the rectifier and the rechargeable battery with a control lead coupled to the processor, wherein the processor, antenna, transceiver, rechargeable battery, induction coil and fault tolerant circuit element are all positioned completely within the non-metallic housing, wherein the processor is configured with processor-executable software instructions to regulate charging of the rechargeable battery when the voltage is generated by the induction coil and rectifier.

8. The explosion-proof communication mobile device of claim 7, wherein the explosion-proof communication mobile device is a cellular telephone.

9. The explosion-proof communication mobile device of claim 7, wherein the cellular telephone is a CDMA cellular telephone.

10. A communications system for use in an explosive environment, comprising:
    a first and second explosion-proof communication relay module; and
    an explosion-proof communication mobile device,
    wherein the first and second explosion-proof communication relay modules each comprise:
      a non-metallic relay housing,
      a relay processor,
      a first relay antenna and a second relay antenna,
      a radio receiver and relay circuit coupled to the relay processor, the first relay antenna and the second relay antenna, the radio receiver and relay circuit configured to receive radio frequency signals from the first relay antenna at a first frequency and retransmit the received signals from the second relay antenna at a second frequency different from the first frequency;
      a relay battery coupled to the relay processor and to the radio receiver and relay circuit; and
      a fault tolerant circuit element coupled to the relay battery,
      wherein the relay processor, first relay antenna, second relay antenna, radio receiver and relay circuit, relay battery and fault tolerant circuit element are all positioned completely within the non-metallic relay housing, and
    wherein the explosion-proof communication mobile device comprises:
      a non-metallic mobile device housing;
      a mobile device processor;
      a mobile device antenna;
      a transceiver coupled to the mobile device processor and to the mobile device antenna, the transceiver configured to receive the first frequency;
      a rechargeable mobile device battery coupled to the mobile device processor and to the transceiver;
      a mobile device induction coil coupled to a mobile device rectifier coupled to the rechargeable mobile device battery, wherein the mobile device induction coil and mobile device rectifier are configured to generate a voltage which can be used to charge the rechargeable mobile device battery when an alternating magnetic field is applied to the mobile device induction coil; and
      a mobile device fault tolerant circuit element coupled to the rechargeable mobile device battery,
      wherein the mobile device processor, mobile device antenna, transceiver, rechargeable mobile device battery, mobile device induction coil and mobile device fault tolerant circuit element are all positioned completely within the non-metallic mobile device housing.

11. The communication system of claim 10, wherein the relay battery is rechargeable, and further comprising a relay induction coil coupled to a relay rectifier coupled to the relay battery, wherein the relay induction coil and relay rectifier are configured to generate a voltage which can be used to charge the relay battery when an alternating magnetic field is applied to the relay induction coil.

12. The communication system of claim 11, further comprising a transistor coupled between the relay rectifier and the relay battery with a control lead coupled to the relay processor, wherein the relay processor is figured with processor-executable software instructions to regulate charging of the relay battery when a voltage is generated by the relay induction coil and relay rectifier.

13. The communication system of claim 10, wherein the radio receiver and relay circuit comprises:
   a signal generator for generating a signal having a third frequency;
   a first mixer circuit coupled to the first and second relay antennas and to the signal generator, the first mixer circuit configured to receive radio frequency signals from the first relay antenna at the first frequency and output the second frequency radio frequency signals to the second relay antenna wherein the second frequency equals a sum of the first frequency and the third frequency; and
   a second mixer circuit coupled to the first and second antenna and to the signal generator, the second mixer circuit configured to receive radio frequency signals from the second relay antenna at the second frequency and output the first frequency radio frequency signal to the first relay antenna wherein the first frequency equals the second frequency minus the third frequency.

14. The communication system of claim 13, wherein the signal generator is coupled to the relay processor and configured to adjust the third frequency in response to signals received from the relay processor.

15. The communication system of claim 10, wherein the relay processor is configured with processor-executable software instructions to perform steps comprising controlling an output power of the radio receiver and relay circuit to maintain the output power at a minimum level consistent with a minimum quality of the service metric and below a maximum output power level.

16. The communication system of claim 10, wherein the explosion-proof communication mobile device is a cellular telephone.

17. The communication system of claim 10, wherein the cellular telephone is a CDMA cellular telephone.

* * * * *